United States Patent
Lu et al.

(10) Patent No.: US 12,086,622 B2
(45) Date of Patent: Sep. 10, 2024

(54) OPTIMIZING VIRTUAL MACHINE SCHEDULING ON NON-UNIFORM CACHE ACCESS (NUCA) SYSTEMS

(71) Applicant: VMware LLC, Palo Alto, CA (US)

(72) Inventors: Xunjia Lu, Los Altos, CA (US); Haoqiang Zheng, Mountain View, CA (US); Yifan Hao, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 452 days.

(21) Appl. No.: 17/384,161

(22) Filed: Jul. 23, 2021

(65) Prior Publication Data

US 2023/0026837 A1  Jan. 26, 2023

(51) Int. Cl.
G06F 9/455 (2018.01)
G06F 9/48 (2006.01)
G06F 9/50 (2006.01)

(52) U.S. Cl.
CPC ........ G06F 9/45558 (2013.01); G06F 9/4881 (2013.01); G06F 9/5033 (2013.01); G06F 9/5077 (2013.01); G06F 9/505 (2013.01)

(58) Field of Classification Search
CPC .. G06F 9/45558; G06F 9/4881; G06F 9/5033; G06F 9/5077; G06F 9/505; G06F 2209/502; G06F 2209/505; G06F 9/5044; G06F 2009/45583
See application file for complete search history.

(56) References Cited

U.S. PATENT DOCUMENTS

| | | | | |
|---|---|---|---|---|
| 2018/0300182 A1* | 10/2018 | Hwang | ................... | G06F 9/505 |
| 2019/0140918 A1* | 5/2019 | Xu | ....................... | H04L 41/5003 |
| 2020/0004543 A1* | 1/2020 | Kumar | .................. | G06F 9/3844 |
| 2020/0334153 A1* | 10/2020 | Zhang | ................. | G06F 12/0891 |
| 2021/0240467 A1* | 8/2021 | Hu | ........................ | G06F 9/3004 |

OTHER PUBLICATIONS

"vCache: Architectural Support for Transparent and Isolated Virtual LLCs in Virtualized Environments," 2015, ACM (Year: 2015).*
Anre Kashyap, "High Performance Computing: Tuning Guide for AMD epyc 7002 Series Processors"; https://developer.amd.com/wp-content/resources/56827-1-0.pdf; Jan. 2020, 22 pages.
"Imbalanced CPU Usage and Increased Contention on ESXI Hosts With AMD EPYC CPUS (67996)"; https://kb.vmware.com/s/article/ 67996, Jul. 23, 2021, 2 pages.
Rajes (Raj) Brat; "VMware vSPHERE Tuning Guide for AMD EPYC™ 7002 Series Processors"; https://developer.amd.com/wp-content/resources/ 56779_1.0.pdf; Nov. 2019; 17 pages.

* cited by examiner

*Primary Examiner* — Sisley N Kim
(74) *Attorney, Agent, or Firm* — Quarles & Brady LLP (57) ABSTRACT

Techniques for optimizing virtual machine (VM) scheduling on a non-uniform cache access (NUCA) system are provided. In one set of embodiments, a hypervisor of the NUCA system can partition the virtual CPUs of each VM running on the system into logical constructs referred to as last level cache (LLC) groups, where each LLC group is sized to match (or at least not exceed) the LLC domain size of the system. The hypervisor can then place/load balance the virtual CPUs of each VM on the system's cores in a manner that attempts to keep virtual CPUs which are part of the same LLC group within the same LLC domain, subject to various factors such as compute load, cache contention, and so on.

18 Claims, 5 Drawing Sheets

OPTIMIZING VIRTUAL MACHINE SCHEDULING ON NON-UNIFORM CACHE ACCESS (NUCA) SYSTEMS

BACKGROUND

Unless otherwise indicated, the subject matter described in this section is not prior art to the claims of the present application and is not admitted as being prior art by inclusion in this section.

Modern computer processors (i.e., central processing units (CPUs)) make use of a hierarchy of hardware caches that allow for high-speed access to often-used data. This enables the processors' execution units (i.e., cores) to run at very fast clock speeds, despite the relatively high latency of main memory. The highest level cache in a CPU cache hierarchy-which is the last cache in the hierarchy that is searched before accessing main memory—is referred to as a last level cache (LLC).

Large memory and compute systems are typically designed with multiple processor sockets, each directly attached to a pool of local main memory and indirectly attached to the local memories of other processor sockets (i.e., remote memories) via an interconnect or bus. This architecture is known as a non-uniform memory access (NUMA) architecture because the processor installed in each processor socket can access data in its local memory faster (i.e., with lower latency) than data in a remote memory, resulting in varying memory access times. A grouping of a processor socket and its local memory is generally referred to as a NUMA node.

Many processors employ a CPU topology where the processor as a whole, including all of its cores, share access to a single LLC. In a NUMA system that uses this type of processor, the system's NUMA node boundaries are aligned with its LLC boundaries, which means there is a one-to-one mapping between NUMA nodes and LLCs.

However, certain newer processors (such as, e.g., AMD EPYC processors) employ a CPU topology comprising multiple LLCs, where each LLC is local (i.e., directly attached) to a particular subset of the processor's cores and remote from (i.e., indirectly attached to) other cores in the processor. A grouping of an LLC and its directly attached cores is referred to as an LLC domain (or a core complex (CCX) in AMD parlance), and this type of processor is referred to as a non-uniform cache access (NUCA) processor because each core can access cache lines in its local LLC faster than cache lines in a remote LLC.

One challenge with scheduling the virtual CPUs of virtual machines (VMs) running on a NUMA system with NUCA processors is that existing hypervisors are generally not NUCA aware and thus erroneously assume that the system's NUMA node boundaries align with its LLC boundaries (as in the case of non-NUCA processors) or ignore the LLC boundaries within each NUCA processor. Because of this, existing hypervisors are unable to effectively leverage LLC locality on such a system, resulting in sub-optimal VM performance for many scenarios/workloads.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Certain embodiments of the present disclosure are directed to techniques for scheduling the virtual CPUs of a VM on a NUCA system (i.e., a computer system that includes one or more NUCA processors, each comprising multiple LLC domains) in an optimal manner.

At a high level, these techniques include partitioning, by a hypervisor of the system, the virtual CPUs of the VM into logical constructs referred to as LLC groups, where each LLC group is sized to match (or at least not exceed) the LLC domain size of the system. For example, if the system's NUCA processors include LLC domains comprising four cores per domain, the hypervisor can partition the VM's virtual CPUs into LLC groups that each include, at most, four virtual CPUs.

The techniques further include placing/load balancing, by the hypervisor, the virtual CPUs of the VM on the system's cores in a manner that attempts to keep virtual CPUs which are part of the same LLC group within the same LLC domain, subject to various factors such as compute load, cache contention, and so on. This advantageously increases the LLC locality of the VM's virtual CPUs without "overpacking" (i.e., placing so many virtual CPUs in the same LLC domain that the domain's compute capacity is exceeded), which in turn leads to lower cache access times and improved VM performance. The foregoing and other aspects are described in further detail in the sections below.

2. Example NUCA System and Solution Design

Figure 1A:
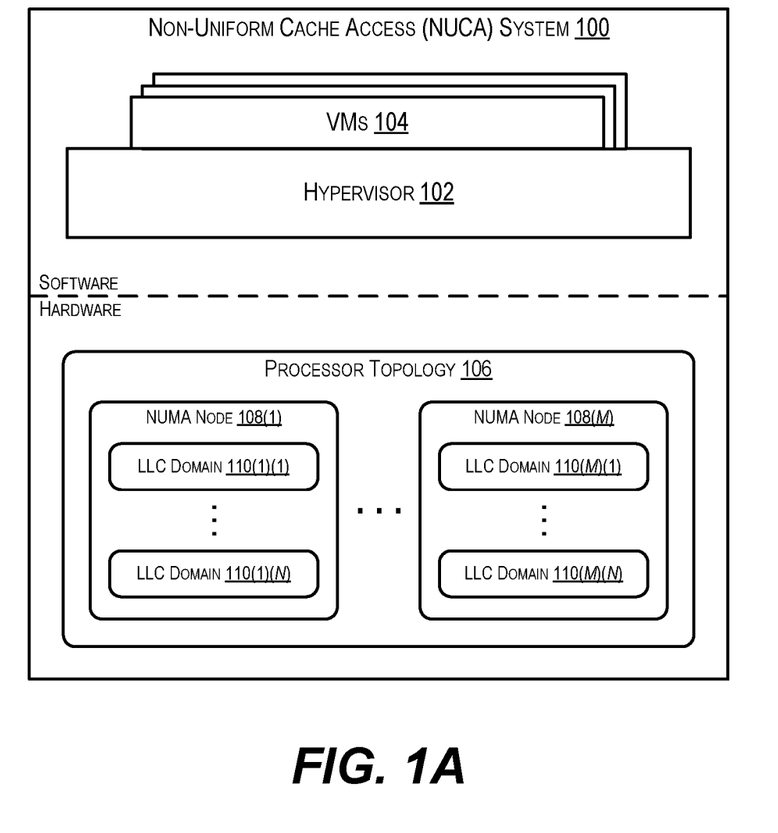
FIGS. 1A and 1B depict an example NUCA computer system.
Figure 1B:
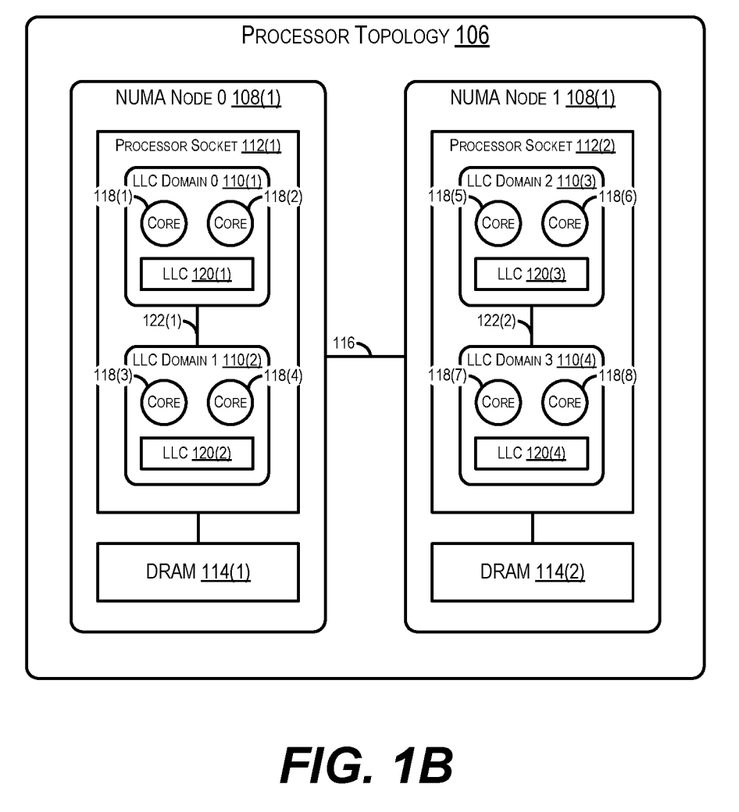

FIGS. 1A and 1B are simplified block diagrams of a NUCA computer system 100 in which embodiments of the present disclosure may be implemented. As shown in FIG. 1A, NUCA system 100 includes a hypervisor 102 and one or more VMs 104, as well as a processor topology 106 comprising a set of M NUMA nodes 108 and a set of N LLC domains 110 per NUMA node. As mentioned previously, a NUMA node is a grouping of a compute resource (e.g., a processor socket) and a memory (e.g., dynamic random-access memory (DRAM)) that exhibits the property of non-uniform memory access, which means that the compute resource is able to access the memory of its NUMA node (referred to as local memory) faster—or in other words, with lower latency—than the memories of other NUMA nodes (referred to as remote memories). An LLC domain is a grouping of one or more cores and a last level cache (LLC) within a processor that exhibits the property of non-uniform cache access, which means that the one or more cores are able to access the LLC of its LLC domain (referred to as a local LLC) faster than the LLCs of other LLC domains (referred to as remote LLCs) that reside on the same processor or other processors. A processor that includes multiple LLC domains is a NUCA processor.

FIG. 1B depicts an example configuration for processor topology 106 of system 100 that comprises two NUMA nodes 0 and 1 (reference numerals 108(1) and 108(2)), each including a processor socket 112(1)/112(2) and a directly-attached DRAM 114(1)/114(2) (e.g., a DRAM that is accessed via an on-die memory controller of its corresponding socket). NUMA nodes 0 and 1 are coupled via an inter-socket interconnect 116 that allows processor socket 112(1) of node 0 to remotely access DRAM 114(2) of node 1 and allows processor socket 112(2) of node 1 to remotely access DRAM 114(1) of node 0. Processor sockets 112(1) and 112(2) are assumed to be populated with NUCA processors, such as an AMD EPYC or other similar processor.

Processor socket 112(1) includes two LLC domains 0 and 1 (reference numerals 110(1) and 110(2)), each of which consists of two processor cores 118(1) and 118(2)/118(3) and 118(4) that are directly attached to an LLC 120(1)/120(2). Similarly, processor socket 112(2) includes two LLC domains 2 and 3 (reference numerals 110(3) and 110(4)), each of which consists of two processor cores 118(5) and 118(6)/118(7) and 118(8) that are directly attached to an LLC 120(3)/120(4). The LLC domains in each processor socket 112(1)/112(2) are coupled via an inter-LLC interconnect 122(1)/122(2) that allow the cores in one LLC domain of the processor socket to remotely access the LLC in the other LLC domain of the processor socket. In addition, inter-socket interconnect 116 allows the cores in LLC domains 0 and 1 of processor socket 112(1) to remotely access the LLCs of LLC domains 2 and 3 of processor socket 112(2), and vice versa.

The processor topology illustrated in FIG. 1B results in disparate memory access costs for local DRAM and remote DRAM across NUMA nodes 0 and 1, as well as disparate cache access costs for local LLC and remote LLC across LLC domains 0-3. In this type of topology. existing hypervisors—which are NUMA aware—are generally configured to split the virtual CPUs of a VM into logical groups known as NUMA groups (where each NUMA group is sized according to the NUMA node size of the system), and place the virtual CPUs for execution on the system's processor cores such that virtual CPUs in the same NUMA group are mostly mapped to the same NUMA node, thereby maximizing DRAM locality.

However, because these existing hypervisors are not NUCA aware (i.e., they do not have logic to handle multiple LLCs per NUMA node/processor socket), they either (1) assume that the system's NUMA node boundaries align with its LLC boundaries, or (2) simply ignore the LLC boundaries in each NUMA node/processor socket. The outcome of (1) is that the hypervisor will place all of the virtual CPUs in a NUMA group within a single LLC domain of a NUMA node, which will typically result in CPU contention because the LLC domain size in a NUCA system like system 100 is smaller than the NUMA node (and thus, NUMA group) size.

The outcome of (2) is that the hypervisor will place the virtual CPUs of a NUMA group uniformly across all of the cores in a NUMA node, without regard to the number or boundaries of LLC domains within that NUMA node. While this mitigates the CPU contention issue of approach (1), this approach necessarily spreads the virtual CPUs across different LLC domains, resulting in reduced LLC locality for the VM and thus reduced VM performance. This is particularly problematic because some NUCA processor designs exhibit remote LLC access costs that come close to, or in some cases even exceed, the relatively high cost of accessing main memory.

Figure 2:
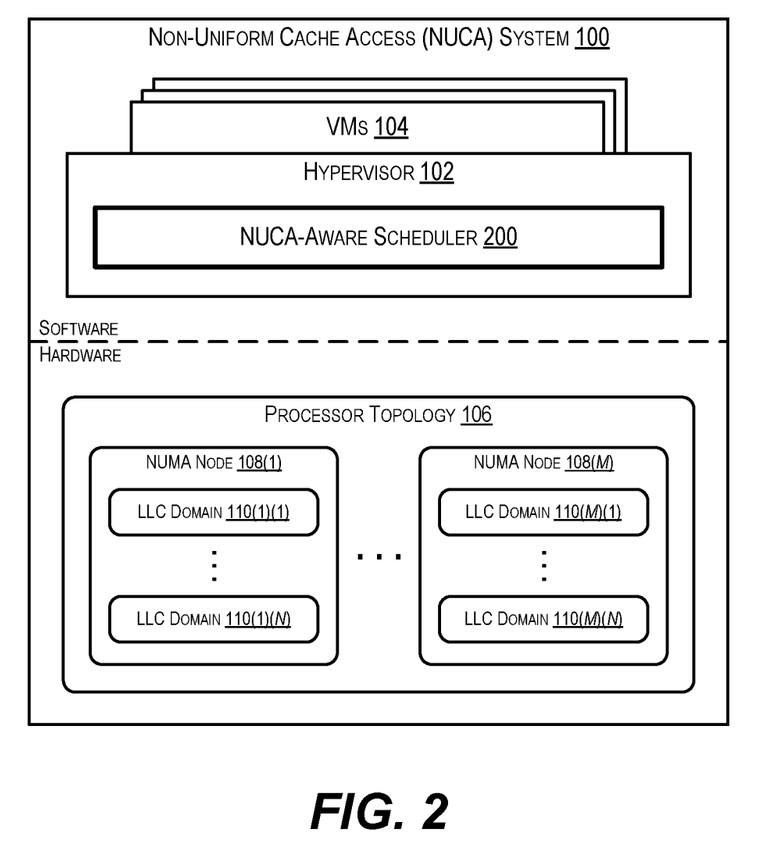
FIG. 2 depicts a modified version of the system of FIGS. 1A and 1B according to certain embodiments.

To address the foregoing and other similar issues, FIG. 2 depicts a modified version of NUCA system 100 that includes, within hypervisor 102, a novel NUCA-aware scheduler 200 according to certain embodiments. Generally speaking, NUCA-aware scheduler 200 is designed to understand that NUMA nodes 108 of system 100 includes multiple LLC domains 110 with distinct cache access costs and to place the virtual CPUs of each VM 104 running on system 100 onto as few LLC domains as possible (which maximizes LLC locality for the VM) while avoiding overpacking (which avoids CPU contention).

For example, at the time of VM boot, NUCA-aware scheduler 200 can partition the virtual CPUs of each VM 104 into logical constructs/groupings referred to as LLC groups, where the size of each LLC group (i.e., the number of virtual CPUs in the LLC group) is bounded by the LLC domain size of system 100 (i.e., the number of cores in each LLC domain). In certain embodiments, the LLC groups can be created as subsets of the NUMA groups mentioned previously, such that each NUMA group is divided into one or more LLC groups. In these embodiments, NUCA-aware scheduler 200 can ensure that the virtual CPUs in a given LLC group are not spread across different NUMA groups.

LLC domain-aware scheduler 200 can then place/load balance the virtual CPUs of each VM 104 onto the cores of system 100 in a manner that attempts to keep virtual CPUs of the same LLC group on the same LLC domain, while at the same time balancing compute load across the LLC domains. In one set of embodiments (detailed in section (4) below), this is achieved by designating one virtual CPU in each LLC group as a "group leader" and all other virtual CPUs in that LLC group as a "group follower." With these designations in place, at the time of determining a new placement for a virtual CPU v of an LLC group g. NUCA-aware scheduler 200 can check whether v is the group leader or a group follower of g.

If virtual CPU v is a group follower, NUCA-aware scheduler 200 can evaluate the potential candidate cores on which v may be placed by computing, for each candidate core c, an efficiency cost of migrating v to core c, where this cost computation is based on two components: (1) CPU load related factors and (2) and a "leader affinity" factor that pertains to whether the group leader of LLC group g currently resides on a core in the same LLC domain as core c. If the group leader is placed on the same LLC domain as c, then the cost score will be reduced by some amount or scaling factor in order to encourage group follower v to "follow" the group leader to that LLC domain. NUCA-aware scheduler can then place group follower v on the candidate core with the lowest cost. Generally speaking, component (2) will cause group follower v to be placed on the same LLC domain as the group leader and most (or all) of the other member virtual CPUs of LLC group g, subject to the CPU load factors of (1).

Conversely, if virtual CPU v is a group leader, NUCA-aware scheduler 200 can evaluate the potential candidate cores on which v may be placed by computing, for each candidate core c, a first efficiency cost of migrating group leader v by itself to core c, and a second efficiency cost of migrating all of the group followers of LLC group g to the LLC domain of core c. The first efficiency cost can consider CPU load factors that are identical or similar to component (1) described with respect to the group follower scenario above, while the second efficiency cost can take into account LLC level factors such as LLC contention and the like. Accordingly, the analysis for placing group leader v can include an LLC level analysis for placing that leader's entire LLC group on a particular LLC domain. NUCA-aware scheduler 200 can then combine the first and second efficiency costs into an aggregated efficiency cost and place group leader v on the candidate core with the lowest aggregated cost. Because the placement logic for group followers is biased towards following the group leader as described above, other member virtual CPUs (i.e., group followers) of LLC group g will typically follow the group leader to the same LLC domain based on their individual efficiency costs. This, in turn, will ultimately cause all member virtual CPUs of LLC group g to migrate to the same LLC domain, resulting in high LLC locality for the VM and thus improved VM performance.

The remaining sections of this disclosure provide additional details regarding a particular implementation of NUCA-aware scheduler 200, including workflows for creating LLC groups and placing/load balancing virtual CPUs based on those LLC groups. It should be appreciated that the foregoing description is illustrative and not intended to limit embodiments of the present disclosure. For example, although NUCA-aware scheduler 200 is specifically described as grouping and scheduling the virtual CPUs of VMs on LLC domains, the same principles may also be applied to group and schedule other types of computing contexts in a NUCA-aware manner, such as containers, processes, threads, and so on. One of ordinary skill in the art will recognize other variations, modifications, and alternatives.

3. LLC Group Creation

Figure 3:
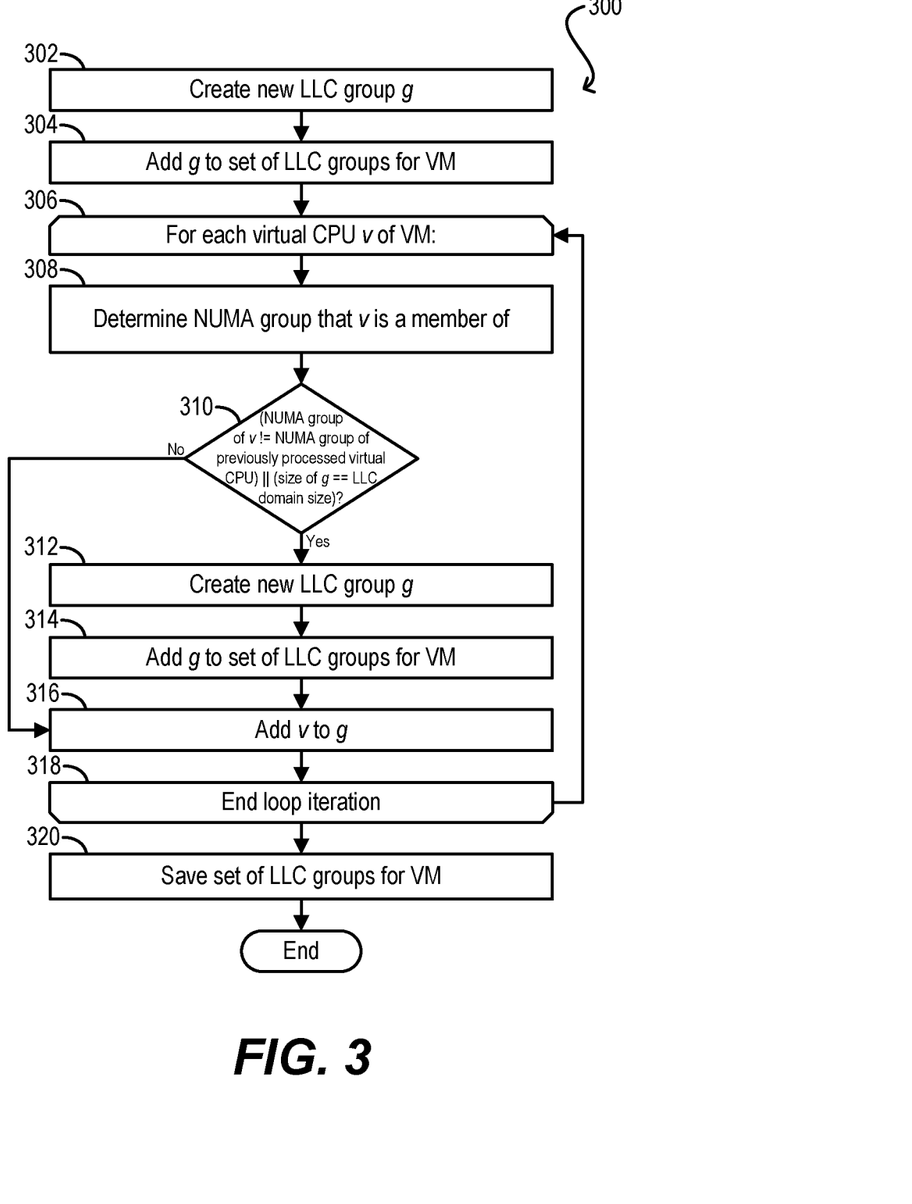
FIG. 3 depicts a workflow for creating LLC groups for a VM according to certain embodiments.

FIG. 3 depicts a workflow 300 that can be performed by NUCA-aware scheduler 200 of FIG. 2 for partitioning the virtual CPUs of a VM 104 running on NUCA system 100 into LLC groups according to certain embodiments. Workflow 300 assumes that NUCA-aware scheduler 200 has knowledge of the physical processor topology of system 100, including the number of LLC domains 110 in each NUMA node 108 and the size of (i.e., number of cores in) each LLC domain 110. Workflow 300 also assumes that the virtual CPUs of the VM are split into one or more NUMA groups per hypervisor 106's existing NUMA handling logic, in the order of the virtual CPUs' identifiers (IDs). For example, if there are four virtual CPUs 0-3 evenly split into two NUMA groups, virtual CPUs 0 and 1 would be part of the first NUMA group and virtual CPUs 2 and 3 would be part of the second NUMA group.

Starting with blocks 302-306, at the time of VM power on, NUCA-aware scheduler 200 can create a new LLC group g, add g to a set of LLC groups for the VM, and enter a loop for each virtual CPU v of the VM. Within this loop, NUCA-aware scheduler 200 can determine the NUMA group n that virtual CPU v is a member of (block 308) and check whether (1) n is different from the NUMA group for the previously processed virtual CPU in this loop, or (2) the size of (i.e., number of virtual CPUs in) LLC group g is equal to the LLC domain size of system 100 (block 310).

If the answer at block 310 is yes-which indicates that either virtual CPU v is part of a different NUMA group than the previously processed virtual CPU or the size of the current LLC group has reached its maximum allowable size-NUCA-aware scheduler 200 can create a new LLC group g (block 312) and add g to the set of LLC groups (block 314). NUCA-aware scheduler 200 can then add virtual CPU v to LLC group g (block 316), thereby adding the virtual CPU to the current LLC group, reach the end of the current loop iteration (block 318), and return to block 306 in order to process the next virtual CPU of the VM.

Finally, upon processing all of the VM's virtual CPUs, NUCA-aware scheduler 200 can save the set of LLC groups for the VM (block 320) and workflow 300 can end.

4. Placing/Load Balancing Virtual CPUs

Figure 4:
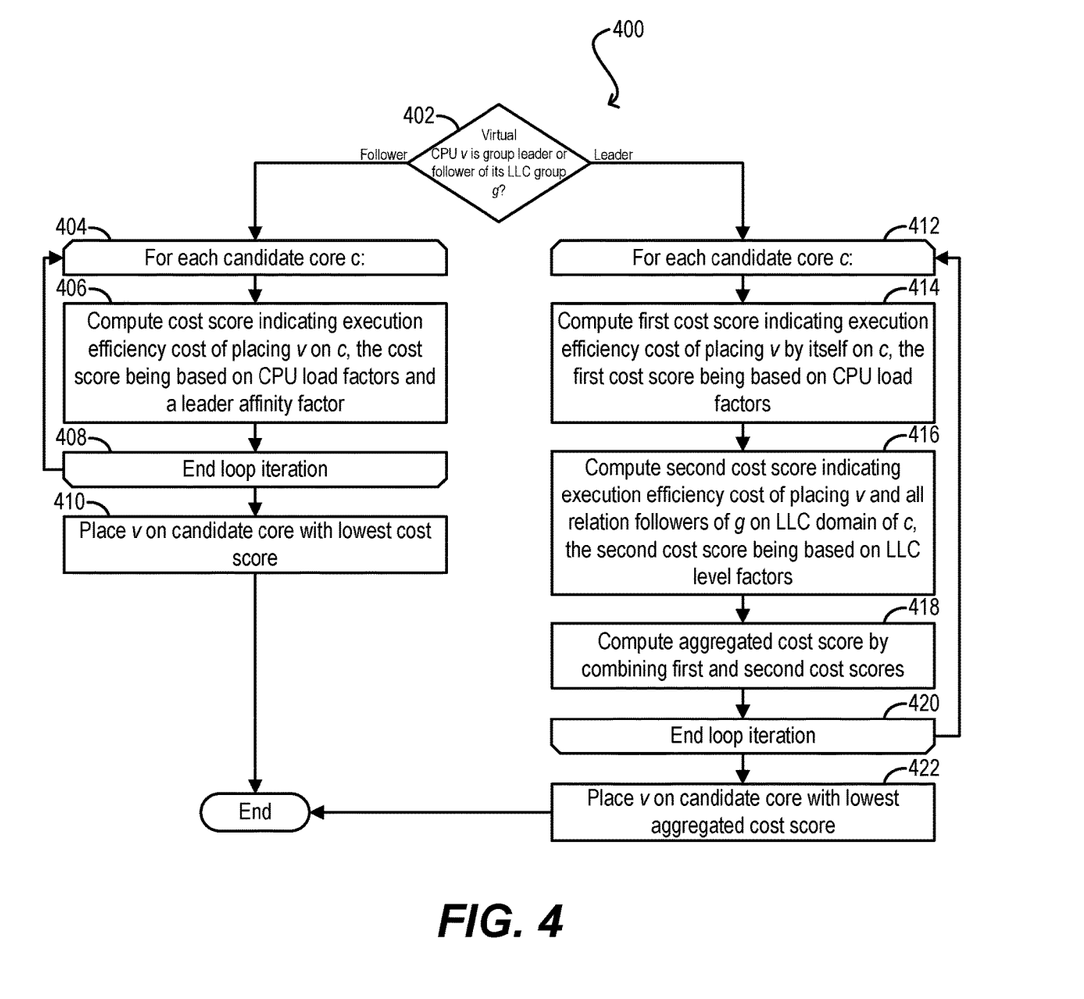
FIG. 4 depicts a workflow for placing/load balancing a virtual CPU of a VM according to certain embodiments.

FIG. 4 depicts a workflow 400 that can be performed by NUCA-aware scheduler 200 for placing/load balancing a given virtual CPU v of a VM 104 onto a core of NUCA system 100 according to certain embodiments. Workflow 400 assumes that the VM's virtual CPUs have been partitioned into LLC groups per workflow 300 of FIG. 3 and each virtual CPU has been designated as either a group leader or follower of its respective LLC group in accordance with the description in section (2) above. Generally speaking, NUCA-aware scheduler 200 can execute workflow 400 any time a decision needs to be made on placing or migrating virtual CPU v to a new core, such as when v awakens from sleep, when the core on which v is currently running has become overloaded, and so on.

Starting with block 402, NUCA-aware scheduler 200 can check whether virtual CPU v is a group leader or follower of the LLC group that it is a member of (i.e., LLC group g). If virtual CPU v is a group follower, NUCA-aware scheduler 200 can enter a loop 404 for each candidate core c of system 100 on which virtual CPU v can be placed (note that this can include the core that v currently resides on). NUCA-aware scheduler 200 can then compute a cost score indicating the execution efficiency cost of placing virtual CPU v on candidate core c, where the cost score is based on both general CPU load related factors and a leader affinity factor (block 406). As mentioned previously, this leader affinity factor can cause the cost score to be reduced if the group leader of LLC group g currently runs on a core in the same LLC domain as candidate core c.

At block 408, NUCA-aware scheduler 200 can reach the end of the current loop iteration and return to block 404 in order to process the next candidate core. Upon processing all of these candidate cores, NUCA-aware scheduler 200 can place virtual CPU v on the candidate core with the lowest cost score (block 410) and terminate the workflow.

Returning now to block 402, if virtual CPU v is a group leader of LLC group g, NUCA-aware scheduler 200 can enter a loop 412 for each candidate core c of system 100 on which virtual CPU v can be placed (as with loop 404, this loop can include the core that v currently resides on). Within loop 412, NUCA-aware scheduler 200 can compute a first cost score indicating the execution efficiency cost of placing v by itself on candidate core c (block 414). This first efficiency cost score can be based the same or similar CPU related load factors applied at block 406.

In addition, NUCA-aware scheduler 200 can compute a second cost score indicating the execution efficiency cost of placing group leader v, as well as all group followers in LLC group g, on the LLC domain of candidate core c (block 416). This second cost score can consider various LLC level factors such as:

1. Migration cost—captures efficiency loss due to loss of LLC state by migrating virtual CPU c from its current location to the LLC domain of candidate core c
2. LLC contention cost—captures efficiency loss due to LLC cache contention at the LLC domain of candidate core c, in view of the existing cache load at d
3. Inter-node parallelism cost—captures efficiency loss for the VM that may arise from requiring one or more of its virtual CPUs to take turns in running due to overpacking at the LLC domain of candidate core c 4. Compute efficiency cost—captures efficiency loss that may arise due to hyperthreading contention at the LLC domain of candidate core c (e.g., a scenario where one or more virtual CPUs need to run on hyper-threads of the same core due to the existing virtual CPU footprint at that LLC domain)

At blocks 418 and 420, NUCA-aware scheduler 200 can compute an aggregated cost score based on the first and second cost scores, reach the end of the current loop iteration, and return to block 412 in order to process the next candidate core. Finally, upon processing all of these candidate cores, NUCA-aware scheduler 200 can place virtual CPU v on the candidate core with the lowest aggregated cost score (block 422) and terminate the workflow.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   partitioning, by a hypervisor of a computer system, a plurality of virtual central processing units (CPUs) of a virtual machine (VM) running on the computer system into one or more last level cache (LLC) groups, wherein the computer system includes at least one non-uniform cache access (NUCA) processor comprising a plurality of LLC domains, wherein each LLC domain includes K cores of the NUCA processor, and wherein a size of each LLC group is less than or equal to K; and
   placing, by the hypervisor, each virtual CPU of the VM on a core of an LLC domain in the plurality of LLC domains based, at least in part, on the LLC group that the virtual CPU is a member of;
   wherein a first virtual CPU in each LLC group is designated as a group leader and other virtual CPUs in the LLC group are designated as group followers, and
   wherein the placing comprises, for each virtual CPU of the VM, determining whether the virtual CPU is a group leader or a group follower.

2. The method of claim 1 wherein the hypervisor attempts to place the plurality of virtual CPUs on a minimal number of LLC domains without exceeding a compute capacity of any single LLC domain.

3. The method of claim 1 wherein the computer system includes a plurality of NUCA processors that are part of a NUMA topology of the computer system, wherein the plurality of virtual CPUs are divided into one or more NUMA groups based on the NUMA topology, and wherein the hypervisor performs the partitioning in a manner that ensures the virtual CPUs in each LLC group are not members of different NUMA groups.

4. The method of claim 1 wherein the placing further comprises, if the virtual CPU is a group follower:
   computing, for each of a plurality of candidate cores, a cost score indicating an execution efficiency cost for placing the virtual CPU on said each candidate core; and
   placing the virtual CPU on a candidate core with the lowest cost score.

5. The method of claim 4 wherein the cost score is based on one or more CPU load factors and a leader affinity factor pertaining to current placement of the group leader of the virtual CPU's LLC group.

6. The method of claim 1 wherein the placing further comprises, if the virtual CPU is a group leader:
   computing, for each of a plurality of candidate cores, a first cost score indicating an execution efficiency cost for placing the virtual CPU on said each candidate core and a second cost score indicating an execution efficiency cost for placing all virtual CPUs in the virtual CPU's LLC group on an LLC domain of said each candidate core;
   computing an aggregated cost score based on the first and second cost scores; and
   placing the virtual CPU on a candidate core with the lowest aggregated cost score.

7. A non-transitory computer readable storage medium having stored thereon program code executable by a hypervisor of a computer system, the program code embodying a method comprising:
   partitioning a plurality of virtual central processing units (CPUs) of a virtual machine (VM) running on the computer system into one or more last level cache (LLC) groups, wherein the computer system includes at least one non-uniform cache access (NUCA) processor comprising a plurality of LLC domains, wherein each LLC domain includes K cores of the NUCA processor, and wherein a size of each LLC group is less than or equal to K; and
   placing each virtual CPU of the VM on a core of an LLC domain in the plurality of LLC domains based, at least in part, on the LLC group that the virtual CPU is a member of;
   wherein the computer system includes a plurality of NUCA processors that are part of a NUMA topology of the computer system, wherein the plurality of virtual CPUs is divided into one or more NUMA groups based on the NUMA topology, and wherein the hypervisor performs the partitioning in a manner that ensures the virtual CPUs in each LLC group are not members of different NUMA groups.

8. The non-transitory computer readable storage medium of claim 7 wherein the hypervisor attempts to place the plurality of virtual CPUs on a minimal number of LLC domains without exceeding a compute capacity of any single LLC domain.

9. The non-transitory computer readable storage medium of claim 7 wherein a first virtual CPU in each LLC group is designated as a group leader and other virtual CPUs in the LLC group are designated as group followers, and
   wherein the placing comprises, for each virtual CPU of the VM, determining whether the virtual CPU is a group leader or a group follower.

10. The non-transitory computer readable storage medium of claim 9 wherein the placing further comprises, if the virtual CPU is a group follower:
    computing, for each of a plurality of candidate cores, a cost score indicating an execution efficiency cost for placing the virtual CPU on said each candidate core; and
    placing the virtual CPU on a candidate core with the lowest cost score.

11. The non-transitory computer readable storage medium of claim 10 wherein the cost score is based on one or more CPU load factors and a leader affinity factor pertaining to current placement of the group leader of the virtual CPU's LLC group.

12. The non-transitory computer readable storage medium of claim 9 wherein the placing further comprises, if the virtual CPU is a group leader:
    computing, for each of a plurality of candidate cores, a first cost score indicating an execution efficiency cost for placing the virtual CPU on said each candidate core and a second cost score indicating an execution efficiency cost for placing all virtual CPUs in the virtual CPU's LLC group on an LLC domain of said each candidate core;
    computing an aggregated cost score based on the first and second cost scores; and
    placing the virtual CPU on a candidate core with the lowest aggregated cost score.

13. A computer system comprising:
    a hypervisor;

at least one non-uniform cache access (NUCA) processor comprising a plurality of last level cache (LLC) domains; and a non-transitory computer readable medium having stored thereon program code that causes the hypervisor to:

partition a plurality of virtual central processing units (CPUs) of a virtual machine (VM) running on the computer system into one or more LLC groups, wherein each LLC domain includes K cores of the NUCA processor, and wherein a size of each LLC group is less than or equal to K; and place each virtual CPU of the VM on a core of an LLC domain in the plurality of LLC domains based, at least in part, on the LLC group that the virtual CPU is a member of;

wherein a first virtual CPU in each LLC group is designated as a group leader and other virtual CPUs in the LLC group are designated as group followers, and wherein the placing comprises, for each virtual CPU of the VM, determining whether the virtual CPU is a group leader or a group follower.

14. The computer system of claim 13 wherein the hypervisor attempts to place the plurality of virtual CPUs on a minimal number of LLC domains without exceeding a compute capacity any single LLC domain.

15. The computer system of claim 13 wherein the computer system includes a plurality of NUCA processors that are part of a NUMA topology of the computer system, wherein the plurality of virtual CPUs are divided into one or more NUMA groups based on the NUMA topology, and wherein the hypervisor performs the partitioning in a manner that ensures the virtual CPUs in each LLC group are not members of different NUMA groups.

16. The computer system of claim 13 wherein a first virtual CPU in each LLC group is designated as a group leader and other virtual CPUs in the LLC group are designated as group followers, and wherein the placing comprises, for each virtual CPU of the VM, determining whether the virtual CPU is a group leader or a group follower.

17. The computer system of claim 13 wherein the cost score is based on one or more CPU load factors and a leader affinity factor pertaining to current placement of the group leader of the virtual CPU's LLC group.

18. The computer system of claim 16 wherein the placing further comprises, if the virtual CPU is a group leader:

computing, for each of a plurality of candidate cores, a first cost score indicating an execution efficiency cost for placing the virtual CPU on said each candidate core and a second cost score indicating an execution efficiency cost for placing all virtual CPUs in the virtual CPU's LLC group on an LLC domain of said each candidate core;

computing an aggregated cost score based on the first and second cost scores; and placing the virtual CPU on a candidate core with the lowest aggregated cost score.

* * * * *